(12) United States Patent
Kleber

(10) Patent No.: US 8,671,559 B2
(45) Date of Patent: Mar. 18, 2014

(54) SYSTEM FOR JOINING STATOR WIRES

(75) Inventor: Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 13/094,880

(22) Filed: Apr. 27, 2011

(65) Prior Publication Data

US 2012/0274162 A1 Nov. 1, 2012

(51) Int. Cl.
*B23P 19/00* (2006.01)
*H01R 43/042* (2006.01)

(52) U.S. Cl.
USPC ............. 29/753; 29/564.1; 29/732; 72/416; 72/456

(58) Field of Classification Search
USPC ........ 29/753, 564.1, 596, 598, 732, 792, 822, 29/825, 874, 882, 885; 72/409.01, 416, 72/453.16, 456; 310/71, 179, 180, 184, 310/201, 208, 254.1
See application file for complete search history.

(56) References Cited

U.S. PATENT DOCUMENTS

| | | | | |
|---|---|---|---|---|
| 4,614,030 A | * | 9/1986 | Lint et al. | 29/885 |
| 6,230,542 B1 | * | 5/2001 | Frenken | 72/456 |
| 7,564,159 B2 | * | 7/2009 | Ooiwa | 310/179 |

* cited by examiner

*Primary Examiner* — Thiem Phan
(74) *Attorney, Agent, or Firm* — Quinn Law Group, PLLC

(57) ABSTRACT

A method and system is provided to join the wire ends of a stator by placing a crimpable element on a wire end pair such that the wire ends of the wire end pair are surrounded by the crimpable element, and deforming the crimpable element using a crimping tool to form a crimped joint. The crimped joint is configured to provide an electrical connection between the wire ends of the wire end pair. The wire ends may be retained in substantial contact with each other by the crimpable element. The wire end portion of the stator may be immersed in a molten solder bath to form a solder joint joining the wire end pair comprising a crimped joint. The stator may be configured as a bar pin stator including a plurality of bar pins defining the wire ends.

11 Claims, 3 Drawing Sheets

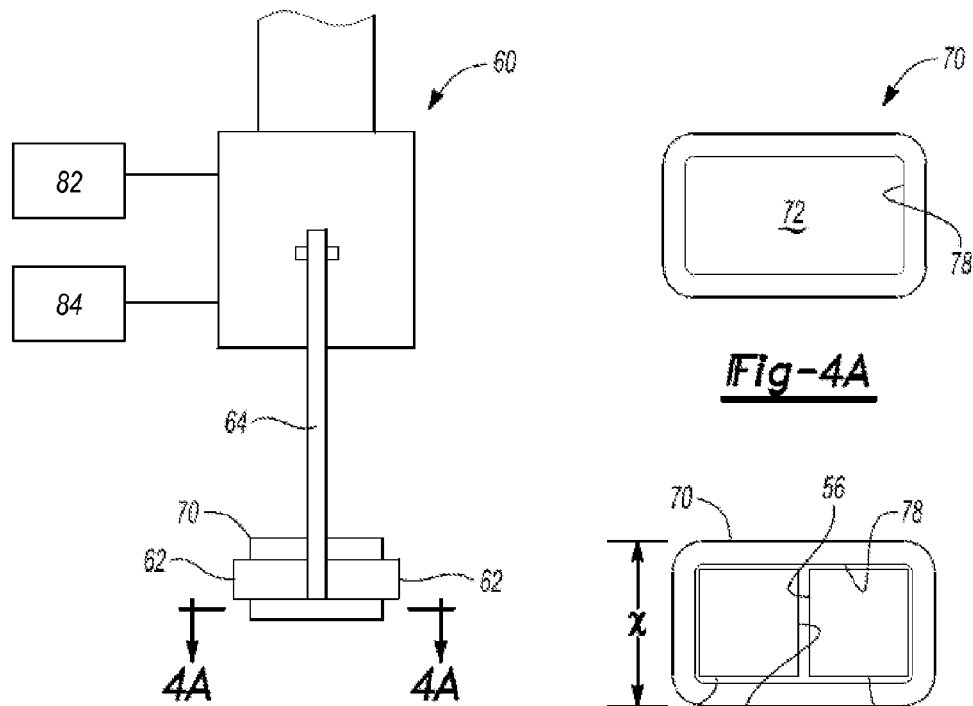
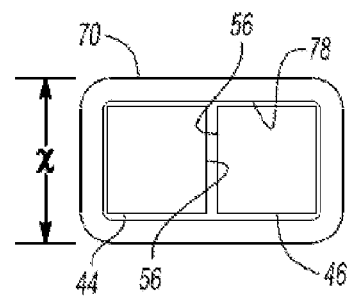
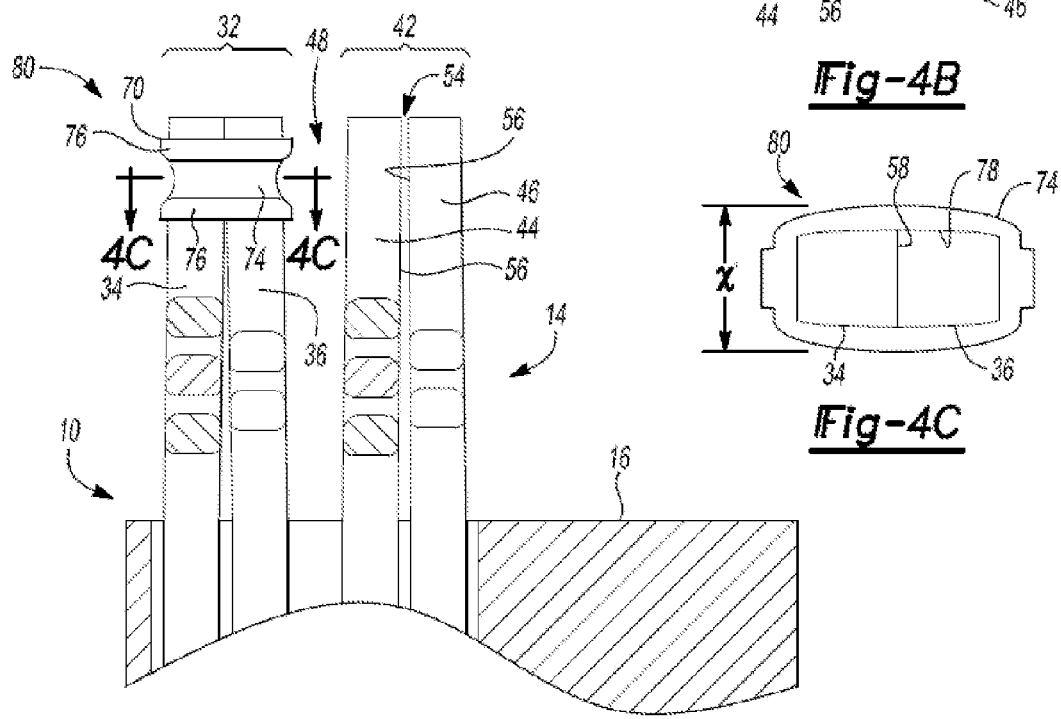

SYSTEM FOR JOINING STATOR WIRES

TECHNICAL FIELD

The present invention relates to a method and system for joining the stator wires of electric devices.

BACKGROUND

Electric devices such as motors and generators having a stator secured within a housing of the motor/generator are well known. A rotor mounted on a shaft is coaxially positioned within the stator and is rotatable relative to the stator about the longitudinal axis of the shaft to transmit the force capacity of the motor. The passage of current through the stator creates a magnetic field tending to rotate the rotor and shaft.

Some stators are generally configured as an annular ring and are formed by stacking thin plates, or laminations, of highly magnetic steel. A copper winding of a specific pattern is configured, typically in slots of the lamination stack, through which current is flowed to magnetize sections of the stator assembly and to create a force reaction that causes the rotation of the rotor.

Bar pin stators are a particular type of stator that include a winding formed from a plurality of bar pins, or bar pin wires. The bar pin wires are formed from a heavy gauge copper wire with a rectangular cross section and generally configured in a hairpin shape having a curved section and typically terminating in two wire ends. The bar pins are accurately formed into a predetermined shape for insertion into specific rectangular slots in the stator, and are typically coated with an insulating material prior to insertion, such that the adjacent surfaces of the pins within the slots are electrically insulated from each other.

Typically, the curved ends of the bar pins protrude from one end of the lamination stack and the wire ends of the bar pins protrude from the opposite end of the lamination stack. After insertion, the portions of the wire protruding from the lamination stack are bent to form a complex weave from wire to wire, creating a plurality of wire end pairs. Adjacent paired wire ends are typically joined to form an electrical connection by welding one wire end to its adjacent or paired wire end to form a welded joint, where each pair of wires is individually welded, for example, by arc welding. The resultant weave pattern and plurality of welded joints determines the flow of current through the motor. To facilitate welding of the wire ends, the wire ends of the bar pins are typically stripped of insulation prior to insertion into the lamination stack and bending into the weave pattern. Electrical conductivity and structural integrity of the welded joint between each of the paired wire ends is a key determiner of motor quality and performance. Joint quality can be affected by the geometry of the wire ends, cleanliness of the wire surfaces prior to welding, defects such as porosity and microcracks introduced into the weld, spatter produced in the arc welding process, the cross-sectional or surface area of the weld and other factors. Joint quality can also be affected by variation in the positioning of the adjacent wire ends as a result of the bending process, where spacing and proximity of the wire ends to each other may contribute to variability in the welded joint. Frequent tooling adjustment or limited tool life may be required during the wire bending process to maintain the tight tolerances required to accurately position the wire ends for the welding operation. The process of arc welding each wire pair joint individually is time consuming and may produce inconsistent welded joints. Variability in the process and configuration of each wire end pair results in variability in the electrical connection of each wire end pair. This may result in thermal variation in the operation of the motor, localized overloading of the welded joint causing an electrical discontinuity, e.g., a short, in the winding due to, for example, welds of minimal surface or cross-sectional area or with a small heat-affected zone, or due to weld splatter between wire end pairs.

SUMMARY

A method of and system for joining the wire ends of a stator assembly is provided herein. The stator assembly may be configured as a bar pin stator including a plurality of bar pins, each bar pin including one or more wire ends. The method includes placing a crimpable element on a wire end pair of a stator assembly such that each of the wire ends of the wire end pair extend through a hollow portion defined by the crimpable element. The crimpable element, which may be configured to substantially surround the wire end pair, may be compressed or deformed using a crimping tool to form a crimped joint. The crimped joint may be configured to provide an electrical connection between the wire ends of the wire end pair, for example, by providing an electrically conductive contact area between the wire ends of the wire end pair. The method may be repeated to form a plurality of crimped joints on a plurality of wire end pairs of a stator, such that the electrical connections formed by the plurality of crimped joints may define a current flow path through a winding of the stator assembly.

The method and system may further include immersing the wire end portion of the stator assembly in a molten solder bath, wherein the wire end portion includes the plurality of crimped joints, such that each of the plurality of crimped joints may be wetted by molten solder. A solder joint may be formed by solidifying the molten solder wicked into the crimped joint, wherein a solder joint thus formed may join the wire ends of the wire end pair of the respective crimped joint, thus providing an electrical connection between the wire ends of the wire end pair.

A stator assembly is described herein, including a plurality of bar pins configured to define a wire end portion including a plurality of wire ends. The plurality of wire ends may be configured in a weave pattern defined by the plurality of wire end pairs, wherein each respective one of the plurality of wire end pairs is joined by a respective crimped joint including a crimpable element. Each crimped joint may provide an electrical connection between the wire ends of the wire end pair included in the crimped joint. The plurality of crimped joints joining the plurality of wire end pairs of the stator assembly may collectively define a current flow path through the weave pattern of the stator.

The crimped joint provides an increased surface area to carry current as compared with an arc welded joint, therefore improving the electrical performance and decreasing the susceptibility of the rotor to overloading and electrical shorts. The electrically conductive area may include the contact area between the crimpable element and the wire ends, and/or between the wire ends themselves, where the wire ends are retained in contact with each other by the deformed portion of the crimped joint. The wire ends may be deformed during the crimping operation such that the contact area therebetween is increased as compared to contact area between the wire ends prior to crimping and/or deformation. The crimping process described herein may be less sensitive to fit variation between the proximate surfaces of the wire ends being joined, in comparison with a welding process, due to the capability to effectively move the wire ends into contact with each other during the crimping process, thereby decreasing the influence of weave pattern accuracy and wire to wire fit on the electrical connection quality of the joint.

In a non-limiting example, the crimped joint may be immersed in a solder bath such that molten solder may be wicked into any openings remaining between the wire ends and/or between the wire ends and the crimpable element in the crimped joint, to form a solder joint which may be reinforcing and/or supplemental to the crimped joint, which may further improve the quality and durability of the electrical conductivity of the joint.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 3 is a partial schematic illustration of a cross section of the wire end portion of the stator of FIG. 2 showing a first wire end pair receiving a crimpable element from a crimping device, and a second wire end pair with a crimped joint formed thereon;

FIG. 4A is a cross-sectional view of section 4A-4A of the crimpable element of FIG. 3;

FIG. 4B is a cross-sectional view of a non-crimped portion of the crimpable element of FIG. 3;

FIG. 4C is a cross-section view of section 4C-4C of a crimped portion of the crimped joint of FIG. 3;

DETAILED DESCRIPTION

Figure 1:
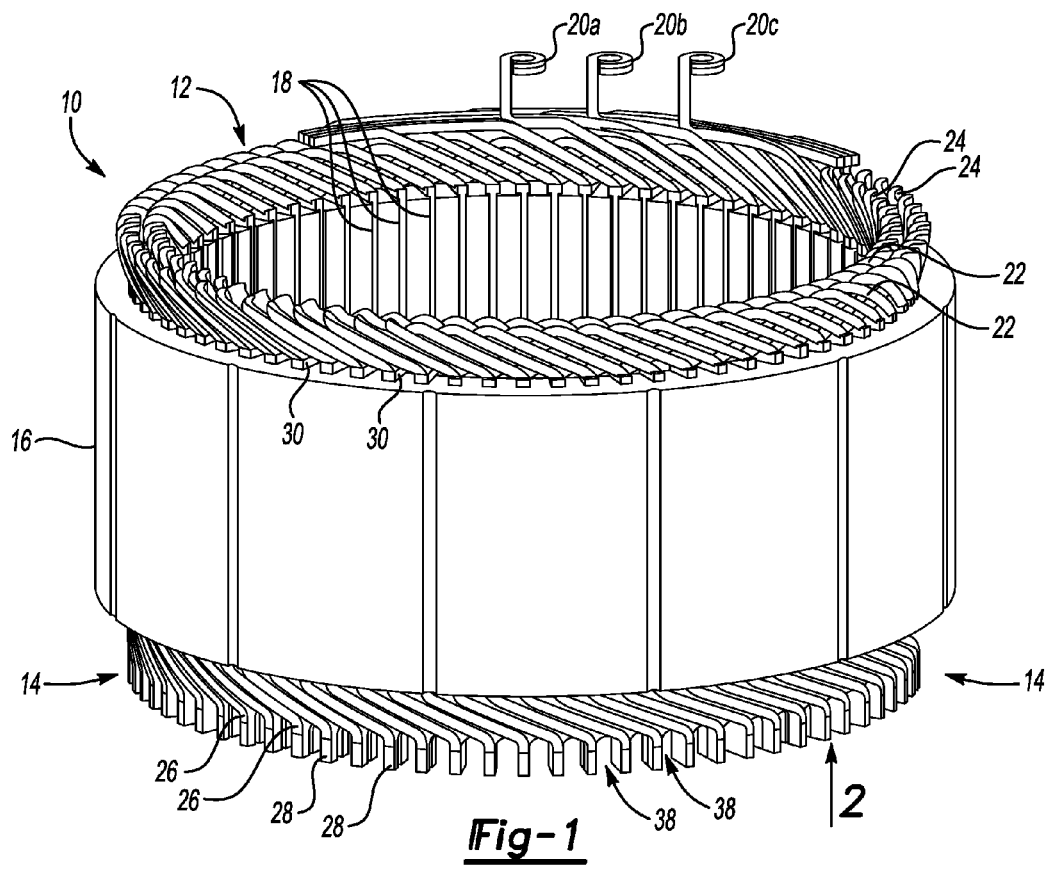
FIG. 1 is a schematic perspective view of a stator assembly prior to joining the wire ends of the stator winding.

Referring to the drawings wherein like reference numbers represent like components throughout the several figures, the elements shown in FIGS. 1-6 are not to scale or proportion. Accordingly, the particular dimensions and applications provided in the drawings presented herein are not to be considered limiting. A method and system of joining the wire ends of a stator assembly is provided. The method and system includes placing a crimpable element on a wire end pair of the stator assembly and compressing or deforming the crimpable element using a crimping tool to form a crimped joint. The crimped joint may be configured to provide an electrical connection between the wire ends of the wire end pair, for example, by providing an electrically conductive contact area between the wire ends of the wire end pair. FIG. 1 shows a stator assembly 10, also referred to as a stator, prior to joining of wire ends 28 by crimping. The stator 10 is generally configured as an annular ring and includes a lamination stack 16, which is formed by stacking laminations in a specific pattern. Each lamination includes a plurality of radially distributed slots which are oriented during assembly of the lamination stack 16 to define a plurality of generally rectangular slots 18 which are distributed radially and extend from end to end of the stack 16.

The stator 10 is shown in FIG. 1 configured as a bar pin stator, wherein a winding 12 is formed from a plurality of bar pins 24, also referred to as bar pin wires. Winding 12 may also include terminals or connections 20a, 20b and 20c, for connecting the various phases of the winding 12. The bar pin wires 24 are typically formed from a heavy gauge, high conductivity copper wire with a rectangular cross section and each bar pin wire 24 is generally configured in a hairpin shape having a curved section 22 and typically terminating in two wire ends 28. The bar pins 24 are accurately formed into a predetermined shape for insertion into the slots 18 in a predetermined weave pattern. The bar pins 24 are typically coated with a layer of an insulating material 26 prior to insertion, such that the adjacent surfaces of the bar pins 24 within the slots 18 are electrically insulated from each other. To facilitate joining of the wire ends 28 to form an electrical connection, the wire ends 28 of the bar pins 24 are typically stripped of the insulating layer 26 prior to insertion into the slots 18 of the lamination stack 16 and prior to bending to form a weave pattern such as the weave pattern shown in FIG. 1 and in additional detail in FIG. 2. Each slot 18 may be lined with a slot liner 30, to insulate the bar pins 24 from the lamination stack 16, and to prevent damage to the insulating layer 26 during insertion of the bar pins 24 in the slots 18.

FIG. 1 shows the curved ends 22 of the bar pins 24 protruding from one end of the lamination stack 16 and the wire ends 28 of the bar pins 24 protruding from the opposite end of the lamination stack 16. After insertion, the wire ends 28 protruding from the lamination stack 16 are bent to form a complex weave from wire to wire, wherein the plurality of bent wire ends 28 is generally referred to as the wire end portion 14 of the stator 10. The wire ends 28 of the bar pins 24 extending through the slots 18 are bent to a desired configuration, as shown in FIG. 1 and in additional detail in FIG. 2, so each respective wire end 28 may be paired with and joined to a different wire end 28 according to the connection requirements of the winding 12, to form a plurality of wire end pairs, such as the wire end pairs 32, 42 shown in FIGS. 2 and 3.

As will be described further in detail, adjacent paired wire ends 28 are joined to form an electrical connection by surrounding the adjacent paired wire ends 28 with a crimpable element 70 (see FIGS. 3-4) and compressing and/or deforming the crimpable element 70 and the adjacent paired wire ends 28 such that one wire end is placed in contact with its paired wire end and a crimped portion 74 (see FIG. 3) to form a crimped joint 80. A crimpable element 70 may be placed on each pair of wires comprising the wire end portion 14, and individually crimped thereby forming a plurality of electrical connections. The resultant weave pattern and plurality of crimped joints 80 determines the path of the current flow through the winding 12.

Figure 2:
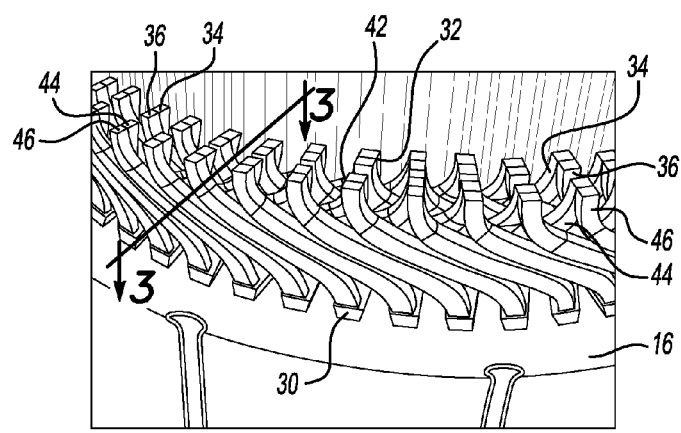
FIG. 2 is a partial schematic perspective view of the wire end portion of the stator assembly of FIG. 1.

FIG. 2 shows, by way of non-limiting example, a representative perspective sectional view of the weave pattern, also referred to as the winding pattern, of the wire end portion 14 of stator 10 in additional detail. The collective wire ends 28 of bar pins 24 have been arranged in four layers in the slots 18 of the lamination stack 16, where the outermost layer includes a plurality of wire ends 28 in the plurality of slots 18 closest to the outer diameter of the lamination stack 16, and the innermost layer includes a plurality of wire ends 28 in the plurality of slots 18 closest to the inner diameter of the lamination stack 16. As shown in FIGS. 2 and 3, the plurality of wire ends forming the innermost or first layer of the winding 12 are identified in FIGS. 2-6B as wire ends 34. The second layer of the winding 12, which is proximate to the first layer, is formed of a plurality of wire ends identified as wire ends 36. The third layer of the winding 12, which is proximate to a fourth or outermost layer, is formed of a plurality of wire ends identified as wire ends 44. The outermost or fourth layer is formed of a plurality of wire ends identified as wire ends 46.

Figure 5:
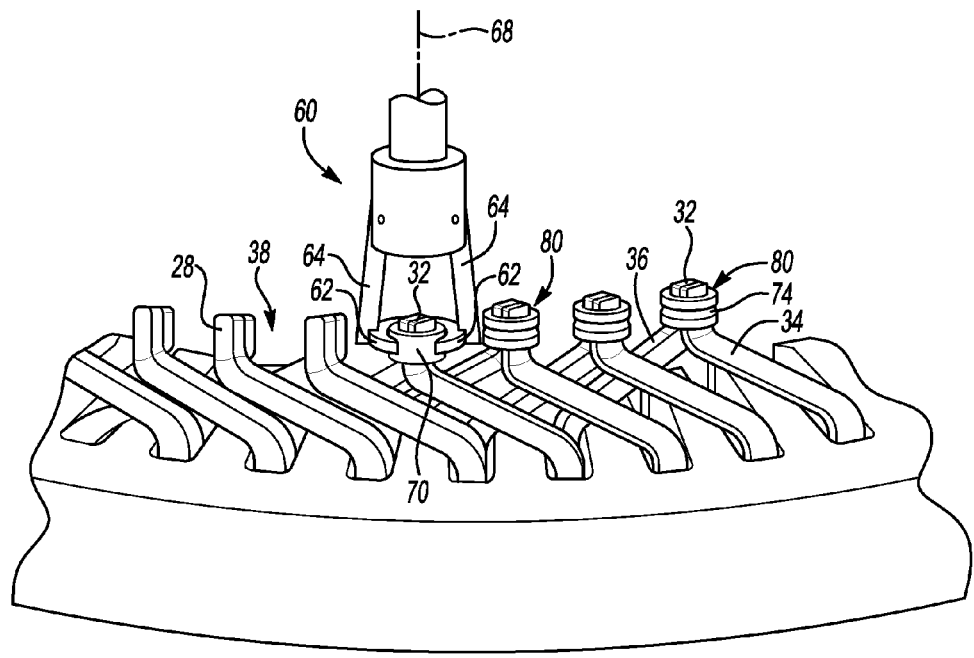
FIG. 5 is a partial schematic illustration of the wire end portion of the stator with a plurality of crimped joints and showing the crimping device.

FIGS. 2 and 3 show each of the wire ends 34 in the first layer is bent such that it is proximate to and paired with a wire end 36 in the second layer, to form a wire end pair 32. FIG. 3 shows a crimpable element 70 being placed on the wire end pair 32 such that the wire end 34 may be held proximate to and/or in contact with the wire end 36. The crimpable element 70 may be deformed (as shown in FIG. 5) to form a crimped portion 74 such that the paired wire ends 34, 36 and the crimpable element 70 forms a crimped joint 80 providing an electrical connection between the wire end 34 and the wire end 36 of the wire end pair 32, similar to the crimped joint 80 shown on the wire end pair 42 of FIG. 3.

Similarly, each of the wire ends 44 in the third layer is bent such that it is proximate to and paired with a wire end 46 in the fourth layer, to form a wire end pair 42. A crimpable element 70 is placed on the wire end pair 42 (see FIG. 3) such that the wire end 44 is held proximate and/or in contact with the wire end 46. The crimpable element 70 is deformed to form a crimped portion 74 such that the paired wire ends 44, 46 and the crimpable element 70 forms a crimped joint 80 providing an electrical connection between the wire end 44 and the wire end 46 of the wire end pair 42.

The wire ends 34, 36, 44, 46 may be collectively referred to as the wire ends 28 (see FIG. 1), when describing the plurality of wire ends comprising the wire end portion 14.

The winding 12 may be configured to include a first winding set and a second winding set. The first winding set may be comprised of the plurality of bar pins 24 forming the first layer of wire ends 34 and the second layer of wire ends 36, e.g., the first winding set may be comprised of the plurality of wire pairs 32. The second winding set may be comprised of the plurality of bar pins 24 forming the third layer of wire ends 44 and the fourth layer of wire ends 46, e.g., the second winding set may be comprised of the plurality of wire pairs 42.

As described previously, electrical current is conducted through the winding 12 via a weave pattern established by the bar pins 24 and the plurality of crimped joints 80 including the wire ends 28. The wire end pairs are configured and bent such that each wire end pair 32, 42 is separated circumferentially and radially from each other wire end pair 32, 42 to minimize the potential for forming an electrical connection between any two wire end pairs. For example, and referring to FIGS. 1, 2 and 5, each wire end pair 32 is arranged in the first winding set such that it is separated circumferentially from an adjacent wire end pair 32 by a circumferential space or interval 38, and each wire end pair 42 is arranged in the second winding set such that it is separated circumferentially from an adjacent wire end pair 42 by a circumferential space or interval 38. Referring now to FIG. 3, it is shown that each wire end pair 32 is separated radially from an adjacent wire end pair 42 by a space or interval 48, wherein the radial space or interval 48 is established by the radial spacing between the second layer of wire ends 36 and the third layer of wire ends 44.

As shown in FIGS. 3 and 5, the crimpable element 70 is placed and/or positioned on a wire end pair 32, 42 by a device 60 and subsequently crimped by a crimping tool 62 to form a crimped joint 80. The crimp tool 62 may also be referred to herein as a set of crimping tools, as crimping jaws, as a set of jaws and/or as jaws. For purposes of illustration, the crimpable element 70 and the process of forming the crimped joint 80 may be described relative to one or the other of the wire end pairs 32, 42, recognizing that the description is applicable to either of the wire end pairs 32, 42, e.g., the crimpable element 70 and the process of forming the crimped joint 80 may be substantially the same for each of the plurality of wire end pairs 32 and each of the plurality of wire end pairs 42 comprising the wire end portion 14 of the stator 10. The crimpable element 70 may also be referred to as a crimp ring.

The wire ends 28 forming the wire end portion 14 of the stator 10 are configured and bent such that the wire ends in each wire end pair 32, 42 are positioned proximate to each other to facilitate receiving a crimpable element 70 onto each wire end pair 32, 42, such that the crimpable element 70 operatively surrounds the two wire ends in the wire end pair. For example, and as shown in FIG. 3, the wire ends 44, 46 of the wire end pair 42 are positioned proximate to each other to facilitate receiving the crimpable element 70, which may be placed on the wire pair end 42 by a crimping device 60, as shown in FIG. 3. The crimpable element 70 may be positioned on the wire end pair 42 such that the wire ends 44, 46 extend into and/or protrude through the hollow portion 72 of the crimpable element 70, as is illustrated by FIGS. 4A and 4B.

In a non-limiting example, the crimpable element 70 may be made of a material containing one or a combination of copper, brass, tin, mild steel, aluminum, stainless steel, or zinc, and configured such that the crimpable element 70 is deformable by a crimping tool 62 to form a crimped portion 74. The choice of material(s) comprising the crimpable element 70 may be based on a number of factors including the formability of the material, e.g., the capability of the material to be deformed or compressed by the crimping tool 62 to form a crimped portion 74 and/or the crimped joint 80. Another factor may be the electrical conductivity of the material, where an electrically conductive path may be established between the crimpable element 70 and at least one of the wire ends 28 in contact with the crimpable element 70. Other factors considered may include corrosion resistance of the crimpable element material, the operating environment of the stator 10, the operating temperature of the stator 10 and/or the wire ends 28, the current flow through the stator winding 12, corrosive elements including humidity and contamination in the operating environment, etc.

The crimpable element 70 may be configured, in the non-limiting example shown in FIGS. 3-4C, as a generally rectangular ring having radiused corners, and defining an opening or hollow portion 72 as shown in additional detail in FIG. 4A. The crimpable element 70 may be shaped such that the surface 78 defining the hollow portion 72 surrounds the outer periphery of the wire end pair upon which the crimpable element 70 is placed, as shown in FIG. 4B for a crimpable element 70 placed on the wire end pair 42. The crimpable element 70 and/or the hollow portion 72 of the crimpable element 70 may be configured to facilitate insertion or placement on a wire end pair 32, 42, such that the crimpable element 70, as it is placed on the wire end pair 32, 42, urges or displaces the wire ends toward one another, which may cause the proximate (adjacent) surfaces 56 of the wire ends to come in contact with each other, thereby defining a contact area 58. The opening 72 and/or the crimpable element 70 may be tapered, flared, chamfered or configured with a lead-in or leading surface to urge the wire ends toward one another during placement on the wire end pair 32, 42, which may facilitate forming the contact area 58.

The crimpable element 70 may be crimped by a crimping tool 62 configured to form a crimped portion 74 to retain the wire ends in contact with each other, as shown for the wire end pair 32 in FIGS. 3 and 4C, such that the contact area 58 thus formed may provide an electrically conductive path between the wire ends 34, 36. The contact area 58 provided by the crimped joint 80 may be significantly larger, for example, than an electrically conductive surface area provided by a welded joint, thereby providing an increased surface area and cross-sectional area to carry electrical current as compared with the welded joint. The increase in the current carrying area may decrease susceptibility of the crimped joint 80 to electrical shorts or other electrical discontinuities, as compared with the welded joint.

Other configurations or features of the crimpable element 70 are possible. The term "ring" is not intended to be limiting or limited to a generally circular configuration, e.g., the crimpable element or crimp ring 70 may be generally configured as an annular or cylindrical element having a generally round, generally oval, or generally rectangular shape, or in any other shape which may correspond to the shape of the wire ends to be joined in the crimped joint 80. The opening or hollow portion 72 may be configured or shaped such that the surface defining the hollow portion 72 fits snugly around the periphery of the wire end pair. A contact area 58 may be established between the wire ends as they are displaced (snugged) together by placement of the crimpable element 70 on the wire end pair 32, 42. The crimpable element 70 may be configured, for example, as an open-ended generally rectangular or generally cylindrical element, e.g., a cup shaped element (not shown) which may be fitted over the wire end pair as a cap, and subsequently crimped and/or deformed to form the crimped joint 80. The crimpable element 70 may be configured as an open ring, e.g., a generally C-shaped or U-shaped element, which may be crimped to substantially surround the periphery of the wire end pair 32, 42 and retain the wire ends 28 in operative contact with each other to provide an electrically conductive contact area 58 therebetween.

FIGS. 3-5 illustrate, in a non-limiting example, a method for joining the wire ends of the stator 10. FIG. 3 shows a crimping device 60 configured to place a crimpable element 70 on a wire end pair, which in FIG. 3 is the wire end pair 42. FIG. 4A shows a cross-sectional view of the crimpable element 70 prior to placement on the wire end pair 42, and FIG. 4B is a cross-sectional view of a non-deformed portion of the crimpable element 70 positioned on the wire end pair, which may be a cross-section view of the crimpable element 70 on the wire end pair 42 prior to crimping, or may be, for example, a cross-sectional view of a non-deformed portion 76 of the crimped joint 80 including the wire end pair 32, as shown in FIG. 3. FIG. 3 further shows a crimped joint 80 formed using the jaws 62 and including the wire end pair 32, and FIG. 4C shows a cross-sectional view of the crimped portion 74 of the crimped joint 80 including the wire end pair 42. For simplicity and clarity of illustration, the process of forming the crimped joint 80 may be described relative to one or the other of the wire end pairs 32, 42, recognizing that the description is applicable to either of the wire end pairs 32, 42. FIG. 5 shows a schematic perspective view of the crimping device 60 forming a crimped joint 80 on one of a plurality of wire end pairs 32. For simplicity and clarity of illustration, FIG. 5 shows only the first winding set of stator 10, consisting of wire end pairs 32. Not shown, but understood, a crimped joint 80 would be formed on each of the plurality of wire end pairs 32 and 42 comprising the wire end portion 14 of the stator 10 to establish a current flow path through the winding 12 of the stator 10.

As shown in FIG. 3, a crimpable element 70 is provided to the stator 10 for placement on a wire end pair, which in the example shown is the wire end pair 42. A device 60 may be used to convey or transport the crimpable element 70 to the stator 10, and to place and/or position the crimpable element 70 such that it is received on the wire end pair 42.

The device 60 may be, as shown in the non-limiting example of FIGS. 3 and 5, configured with a set of jaws 62 wherein each jaw 62 is operatively attached to an arm 64, which may also be referred to as a lever arm. The device 60 may be configured such that each of the arms 64 may be movable radially inward toward an axis 68 (see FIG. 5) of the device 60, such that the jaws 62 may exert a compressive force on a crimpable ring 70, to hold and/or transport the crimpable ring 70 for placement on a wire end pair 32, 42 of the stator 10. The arms 64 may be movable radially outward from the axis 68 to release the crimpable ring 70 held by the jaws 62. The jaws 62 may be configured as a set of crimping tools such that the device 60 may be used to form the crimped joint 80, e.g., the jaws 62 may be configured such that when the lever arms 64 are moved radially inward with sufficient force, the jaws 62 cooperate to deform the crimpable element 70 thus forming the crimped portion 74, as shown in the FIGS. 3 and 5. It would be understood that the weave pattern of the wire end portion 14, e.g., the bending pattern of the wire ends 28, would be configured such that the circumferential spaces 38 and the radial spaces 48 between the wire pairs 32, 42 are of sufficient size (width) to receive the jaws 62 and crimpable element 70 for placement of the crimpable element 70 on the wire end pair and crimping thereof to form the crimped joint 80.

More than one device or method may be used to position and crimp a crimpable element 70 on each of the wire end pairs 32, 42. For example, a first (placing) device may be used to place and/or position a crimpable element 70 on a wire end pair 32, 42, and a second (crimping) device may be used to crimp the crimpable element 70. The placing device may be configured similar to the device 60 shown in FIGS. 3 and 5, or may be of another configuration. The method used to place the crimpable element 70 may be automated, manually controlled, or a combination thereof. The placing device may incorporate an integral feeding mechanism to provide a continuous supply of crimpable elements 70. The crimping device may be configured similar to the device 60 shown in FIGS. 3 and 5, or may be of another configuration. The method used to crimp the crimpable element 70 may be automated, manually controlled, or a combination thereof. The device or devices 60 used to transport, place, position and/or crimp the crimpable element 70 may be controlled hydraulically, electrically, pneumatically, mechanically, or by other suitable means. The device or devices 60 may be in operative communication with one or more sensors 82 and or controllers 84 which may be configured to manipulate, monitor and/or control the device or devices 60 and the crimping process described herein.

The wire ends 44, 46 comprising the wire end pair 42 shown in FIG. 3 are positioned during the bending operation forming the wire end portion 14 such that the wire ends 44, 46 are sufficiently adjacent to each other to receive the crimpable element 70 thereon. The proximate sides or surfaces 56 of the adjacent wire ends 44, 46 may be separated by a gap 54. The configuration of the gap 54, for example, the width of the gap 54, may vary due to variation in the process used to bend or orient the wire ends 44, 46 into a position in the weave pattern forming the wire end portion 14, or may vary due to variation in the size, surface profile or shape of each of the wires ends 44, 46 comprising the wire end pair 42. The wire ends 44, 46 may be positioned as a result of the bending process such that the proximate surfaces 56 are in contact with each other, to form a contact area 58. The size and configuration of the contact area 58 may vary based on the relative position of the proximate surfaces 56 and the configuration or profile of each of the proximate surfaces 56.

Referring again to FIG. 3, a crimpable element 70 may be provided between the jaws 62, and the jaws 62 may be moved radially inward with sufficient compressive force to retain the crimpable element 70 between the jaws 62, without deforming the element 70. The device 60 is manipulated to place the crimpable element 70 on the wire end pair 42 such that the wire ends 44, 46 protrude into and/or through the opening 72 of the crimpable element 70, as shown in the cross-sectional view of FIG. 4B. When positioned on the wire end pair 42, the surface 78 defining the opening 72 of the crimpable element 70 surrounds the outer periphery of the wire pair 42. Prior to crimping, the proximate surfaces 56 (see FIG. 4B) of the wire ends 44, 46 are adjacent to each other and may be separated by a gap 54, or may be positioned in contact with each other such that a contact area 58 is formed.

The lever arms 64 may be actuated by the device 60, in a non-limiting example, to move the jaws 62 radially inward, thus increasing the compressive force on the crimpable element 70 positioned on the wire end pair 42. As the crimping jaws 62 are progressively moved radially inward, sufficient force is exerted by the crimping jaws 62 on the crimpable element 70 such that the crimpable element 70 begins to deform and become compressed against the periphery of the wire ends 44, 46, displacing the wire ends 44, 46 toward each other. As the crimpable element 70 is compressed to form the crimped portion 74 and to push the wire ends 44, 46 together, the gap 54 between the proximate surfaces 56 of the wire ends 44, 46 is substantially reduced and/or eliminated and the contact area 58 is formed and/or increased in size (area), forming an electrically conductive path or joint between the wire ends 44, 46.

As shown in FIG. 4C, the interior surface 78 in the crimped portion may be in direct contact with the periphery of the wire ends 44, 46, such that an electrically conductive path may be established between one or both of the wire ends 44, 46 and the crimped portion 74. In this configuration, the surface area available to conduct electrical current through the crimped joint 80 includes the contact area 58 formed between the proximate surfaces 56, and may further include the area of contact between the wire ends 44, 46 and the surface 78 of the crimped portion 74. Additionally, the crimped joint 80 may be more resistant to separation or degradation due to, for example, vibration, or thermal expansion and contraction due to changes in operating temperature, as compared to a welded joint.

The electrical current in a welded joint (not shown) may be passed only through the fused area of the weld comprised of parent metal from the wire ends, which can be of variable size and susceptible to welding defects including porosity, microcracks, and contamination, or may be an area of variable cross-section due to poor fit between the wire ends in each wire end pair during welding, which may reduce the current carrying capacity of the welded joint. A smaller sized weld may be susceptible to overloading during current loading, causing weld failure and shorting the electrical circuit within the winding. Accordingly, a crimped joint such as the joint 80 provides a greater current carrying area through a first current path defined by the contact area 58 between the proximate surfaces 56 of the wire ends 34, 36 (see FIG. 3), and through a secondary current path which may be provided by the crimped portion 74 in contact with the periphery of the wire ends 34, 36 (see FIG. 4C), thereby providing improved electrical performance, enhanced current carrying capacity and decreased susceptibility of the stator 10 to overloading and electrical shorts.

Using a crimped joint, such as joint 80, to provide the electrical connection between the wire ends 34, 36 is further advantaged by a decreased sensitivity to the configuration of the wire end pair 32, and specifically, to the gap 54 or spacing between the proximate surfaces 56. Whereas the ability to form a weld between the wire ends deteriorates as the gap 54 between the proximate surfaces 56 of the wire ends 34, 36 increases, the crimpable element 70 surrounds the periphery of the wire ends 34, 36 and the crimping of the crimpable element causes displacement of the wire ends 34, 36 toward each other to substantially reduce the gap 54 and form or increase an electrically conductive contact area 58.

As shown in FIG. 3, the crimped joint 80 may be formed such that one or more portions 76 of the crimpable element 70 may be only minimally deformed, or may not be deformed at all. The cross-section of the minimally or not deformed portion 76 may be configured as shown in FIG. 4B, where a gap 54 may remain between the wire ends or between the periphery of the wire end pair and the interior surface 78.

After completing the crimping process, e.g., forming the crimped joint 80, the jaws 62 may be moved radially outward such that the device 60 may be removed from the crimped joint 80. The crimping process may be repeated to form a crimped joint 80 on each of the plurality of wire ends 32, 42 of the wire end portion 14 of the stator 10. The plurality of crimped joints 80 thus formed may collectively define a current flow path through the weave pattern of the stator 10.

The crimping process may be controlled by any suitable method to provide a crimped portion 74 defining a crimped joint 80. By way of non-limiting example, the compressive force exerted by the jaws 62 on the crimpable element 70 may be measured, monitored and/or controlled to a specified force correlated to provide certain characteristics or features of the crimped joint 80. For example, the crimping force may be correlated to a density percentage of the crimped joint 80 measured in a cross-section of the crimped portion 74, where the density percentage of the cross-section could be correlated to the electrical conductivity of the joint to establish a minimum crimping force required to form an acceptable crimped joint, e.g., one capable of providing an electrically conductive path through the crimped joint 80.

As another example, the closing (inward) movement of the crimping tool 62 to a predetermined position may be measured, monitored and/or controlled, where the closed position may be correlated to provide certain characteristics or features of the crimped joint 80, and to control the crimping process. For example, the position of the crimping jaws 62 with respect to each other or to the axis 68 of the device 60 may correlate to a dimension X' (see FIG. 4C), where dimension X' corresponds to the amount of deformation of the crimped portion 74 required to achieve a minimum density percentage correlated to the electrical conductivity of the crimped joint 80. For example, it may be determined that for a combination of a wire end pair comprised of wire ends 44, 46 and a crimpable element 70 of dimension X (see FIG. 4B), that deformation of the crimpable element 70 using jaws 62 causing compression of the dimension X to a smaller dimension X' forms an acceptable crimped joint 80. The dimension X' may be correlated to movement of the jaws 62, movement of the lever arms 64, or by measurement during the crimping process by the device 60 or otherwise.

In yet another example, the configuration of the crimped joint 80 may be measured, monitored and/or controlled to control the crimping process to produce an acceptable crimped joint 80. For example, the crimping jaws 62 may be shaped to provide a specified profile of the crimped portion 74, where the profile, e.g., the configuration of the crimped portion 74 is correlated to the electrical conductivity of the crimped joint 80. Controlling the configuration of the crimped portion 74 may include controlling the height, width, depth, cross-sectional profile, or other shape features of the crimped portion 74, which may be done by controlling the configuration of the jaws 62 used to form the crimped portion 74, by gauging and/or inspecting the crimped joint 80, by monitoring the wear of and/or measuring the jaws 62, or by other techniques understood by those skilled in the art of crimping. It would be understood that the crimping operation may be controlled by controlling one or more of the factors and/or process characteristics or product features, as previously described, which may be controlled separately or in combination and in relation to each other.

Figure 6:
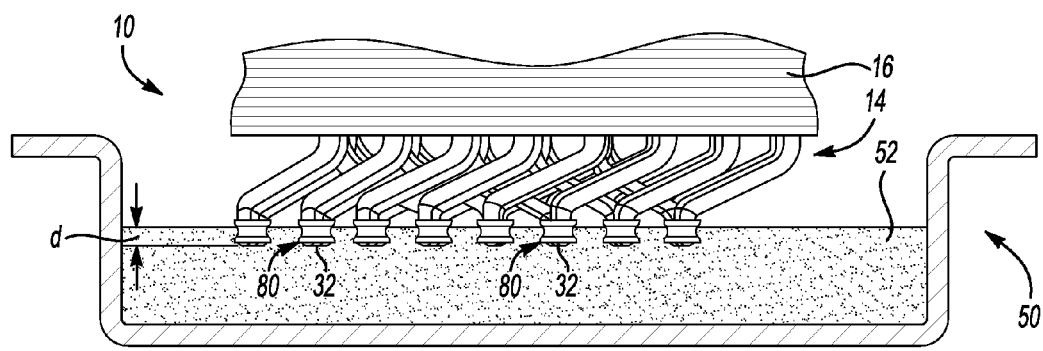
FIG. 6 is a partial schematic illustration of the wire end portion of the stator immersed in a solder bath.

In a non-limiting example shown in FIG. 6, the wire end 14 including the plurality of crimped joints 80 may be immersed in a solder bath 50 such that molten solder 52 may be wicked into any openings or gaps remaining in any of the crimped joints 80, to form a solder joint which may be reinforcing and/or supplemental to the crimped joint 80 to further improve the quality and durability of the electrical conductivity of the joint 80. The solder bath 50 may contain a quantity of molten solder 52. The solder 52 may be of any solder material, such as a tin-based solder, suitable for soldering of copper wire or material(s) used to form the bar pins 24. For simplicity and clarity of illustration, FIG. 6 shows only the first winding set of stator 10, consisting of a plurality of crimped joints 80 including the wire pairs 32. Not shown, but understood, the entire wire end portion 14 consisting of a plurality of crimped joints 80 formed on wire end pairs 32 and 42 would be immersed into the molten solder 52.

The process of immersing the wire end portion 14 into the molten solder 52 to allow wicking of the molten solder into any gaps in the crimped joints 80 may be controlled by controlling one or more factors, which may be controlled separately or in combination and in relation to each other. For example, the duration of immersion of the wire end portion 14 in the molten solder 52 may be controlled to a predetermined time, to ensure adequate wetting of the crimped joints 80 and/or the wire end pairs 32, 42 with molten solder 52, and wicking of molten solder 52 into any gap 54 between the proximate surfaces 56 of the wire ends 28 and/or between the wire ends 28 and the interior surface 78 of the crimpable element 70. Referring to FIG. 3 and FIG. 4B, such gaps may remain, for example, between the wire ends of the wire end pairs 32, 42 in the portions 76 of the crimpable element 70. The portions 76 may be minimally deformed or not deformed during the crimping process, such that the cross-section of the portions 76 may resemble the cross-section shown in FIG. 4B, which may include one or more gaps 54 between the periphery of the wire ends 28 and the interior surface 78 of the portion 76, or between the proximate surfaces 56 of the wire ends. The molten solder 52 may wick into these gaps or areas, and solidify upon removal of the wire end portion 14 from the solder bath 50 to form solder joints within the crimpable joint 80. As another example, the depth of immersion of the wire end portion 14 in the molten solder 52 may be controlled such that the wire end portion 14 is immersed to a depth d, as shown in FIG. 6. The depth d may be determined based on the configuration of the wire end 28, e.g., the surface area from which the insulation 26 has been stripped or otherwise removed to define the stripped wire end 28. The depth d may be determined based on other factors, such as an optimized depth to allow wicking and wetting of molten solder 52 on the wire ends 28 in the minimally deformed portion 76 of the crimped joint 80, and/or to prevent application of the molten solder 52 to other areas or surfaces of the stator 10, such as the insulated portion of the bar pins 24 or the lamination stack 16.

By way of non-limiting example, the stator 10 may be moved by a robot to immerse the wire end portion 14 into and out of the molten solder 52 at a predetermined cycle or interval, where the depth of immersion of the wire end portion 14 in the molten solder 52 may be controlled, for example, by controlling the height of the conveyor or movement of the robot using the non-limiting examples previously discussed, such that the wire end portion 14 is immersed to the depth d.

Other factors, such as the temperature and viscosity of the molten solder 52 may be controlled to predetermined values, to facilitate each of the plurality of crimped joints 80 and wire ends 28 included therein being wetted by molten solder sufficiently to form a solder joint within any gaps remaining in the crimped joint 80, and to form solder joints having structural integrity and configured to provide an electrical connection between the wire ends in the respective wire end pair.

While the best modes for carrying out the invention have been described in detail, those familiar with the art to which this invention relates will recognize various alternative designs and embodiments for practicing the invention within the scope of the appended claims.

The invention claimed is:

1. A system of joining the wire ends of a stator assembly, the system comprising:
a crimping device configured to place an uncrimped crimpable element on a wire end pair such that the uncrimped crimpable element substantially surrounds the wire ends of the wire end pair and retains the wire ends of the wire end pair in proximate contact with each other;
wherein the wire end pair is one of a plurality of wire end pairs configured in a stator assembly; and
a crimping tool configured to deform the uncrimped crimpable element to form crimped portion defining a crimped joint, wherein the crimped joint is configured to provide an electrical connection between the wire ends of the wire end pair.

2. The system of claim 1, wherein:
the crimping device is configured to place a respective uncrimped crimpable element on a respective wire end pair of a plurality of wire end pairs configured in the stator assembly, such that the respective uncrimped crimpable element substantially surrounds the wire ends of the respective wire end pair and retains the wire ends of the respective wire end pair in proximate contact with each other; and
the crimping tool is configured to deform each respective uncrimped crimpable element to form a respective crimped portion defining a crimped joint, wherein each respective crimped joint is configured to provide an electrical connection between the wire ends of each respective wire end pair, thereby forming a plurality of crimped joints each configured to provide an electrical connection within the stator assembly.

3. The system of claim 2, further comprising:
a molten solder bath configured such that a wire end portion of the stator assembly is immersible in the molten solder bath to form a solder joint in at least one of the plurality of crimped joints, wherein the solder joint thus formed joins the wire ends of the wire end pair of said at least one of the plurality of crimped joints to provide an electrical connection therebetween.

4. The system of claim 1,
wherein the stator assembly includes a plurality of bar pins; and
wherein each of the plurality of bar pins includes one or more wire ends.

5. The system of claim 1, wherein the crimping tool is configured to partially deform the crimpable element to form the crimped portion intermediate a first nondeformed portion and a second nondeformed portion of the crimpable element.

6. The system of claim 5, wherein the electrical connection is provided between a wire end of the wire end pair and at least one of the other wire end of the wire end pair and the crimped portion of the crimpable element.

7. The system of claim 1, wherein the crimping device is configured to control at least one of:
the crimping force exerted by the crimping tool on the crimpable element;
the movement of the crimping tool; and
the configuration of the crimped joint.

8. The system of claim 1, wherein the crimping device is in operative communication with a sensor configured to sense a crimping force exerted by the crimping tool on the crimpable element.

9. The system of claim 1, further comprising:
a controller in operative communication with the crimping device;
a sensor in operative communication with the crimping device and configured to measure a closing movement of the crimping tool; and
wherein the controller is configured to control the closing movement of the crimping tool to a predetermined position.

10. The system of claim 1, further comprising:
the crimping tool including a pair of crimping jaws configured to cooperate to deform the crimpable element to form the crimped joint;
a first lever arm movably attached to the crimping device and configured to receive one of the pair of crimping jaws;
a second lever arm movable attached to the crimping device and configured to receive the other of the pair of crimping jaws;
wherein the first and second lever arms are arranged such that the pair of crimping jaws are opposing and movable inwardly toward each other by concurrent movement of the first and the second lever arms to exert a crimping force on the crimpable element.

11. The system of claim 1, wherein:
wherein the crimping tool is configured to partially deform the crimpable element to form the crimped portion defining the crimped joint adjacent a nondeformed portion of the crimpable element defining a gap between the crimpable element and a peripheral surface of the wire end pair;
the system further comprising:
a molten solder bath configured such that a wire end portion of the stator assembly is immersible in the molten solder bath to wick molten solder into the gap to form a solder joint joining the peripheral surface of the wire end pair to the nondeformed portion of the crimpable element.

* * * * *